(12) United States Patent
Warren

(10) Patent No.: US 6,695,013 B2
(45) Date of Patent: *Feb. 24, 2004

(54) METHOD AND DEVICE FOR LINING A LATERAL SEWER PIPE

(75) Inventor: Darcy Warren, Essex (CA)

(73) Assignee: Liqui-Force Sewer Services, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,573

(22) Filed: Oct. 16, 2002

(65) Prior Publication Data

US 2003/0178078 A1 Sep. 25, 2003

Related U.S. Application Data

(63) Continuation of application No. 10/102,059, filed on Mar. 19, 2002, now Pat. No. 6,484,757.

(51) Int. Cl.7 ............................................. F16L 55/162
(52) U.S. Cl. ............................. 138/98; 138/97; 138/93; 156/287; 264/269; 405/150.1
(58) Field of Search ............................. 138/98, 97, 93; 156/287, 294, 423; 264/269; 405/150.1, 184.1, 184.2

(56) References Cited

U.S. PATENT DOCUMENTS

| | | | |
|---|---|---|---|
| 3,968,552 A | 7/1976 | Hunter | 138/109 X |
| 4,434,115 A | 2/1984 | Chick | 264/36.1 |
| 4,893,389 A | 1/1990 | Allen et al. | 138/98 X |
| 4,995,761 A * | 2/1991 | Barton | 405/184.1 |
| 5,108,533 A | 4/1992 | Long, Jr. et al. | 156/294 |
| 5,167,258 A | 12/1992 | Rice | 138/98 |
| 5,393,481 A | 2/1995 | Wood | 264/516 |
| 5,451,284 A | 9/1995 | Ikeda et al. | 156/247 |
| 5,454,401 A | 10/1995 | Kamiyama et al. | 138/98 |
| 5,498,389 A | 3/1996 | Kamiyama et al. | 264/516 |
| 5,520,484 A | 5/1996 | Kamiyama et al. | 405/154 |
| 5,566,719 A | 10/1996 | Kamiyama et al. | 138/98 |
| 5,598,873 A | 2/1997 | Kamiyama et al. | 138/98 |
| 5,609,439 A | 3/1997 | Schreiner et al. | 156/156 X |
| 5,624,629 A | 4/1997 | Wood | 264/516 |
| 5,927,341 A | 7/1999 | Taylor | 138/98 |
| 5,944,058 A | 8/1999 | Kamiyama et al. | 138/98 |
| 5,950,682 A | 9/1999 | Kiest, Jr. | 138/98 |
| 5,971,032 A | 10/1999 | Ward | 138/98 |
| 6,001,212 A | 12/1999 | Polivka et al. | 138/97 X |
| 6,029,726 A | 2/2000 | Tweedie et al. | 156/423 |
| 6,044,867 A | 4/2000 | Tweedie et al. | 138/98 |
| 6,068,725 A | 5/2000 | Tweedie et al. | 138/97 X |
| 6,085,794 A | 7/2000 | Kamiyama et al. | 138/97 X |
| 6,096,363 A | 8/2000 | van Lengerich | 426/549 |
| 6,152,184 A | 11/2000 | Kamiyama et al. | 138/97 X |
| 6,337,114 B1 | 1/2002 | Wood et al. | 138/97 X |
| 6,484,757 B1 * | 11/2002 | Warren | 138/98 |

* cited by examiner

Primary Examiner—Patrick Brinson
(74) Attorney, Agent, or Firm—Carlson, Gaskey & Olds

(57) ABSTRACT

An assembly for introducing a pipe liner into a branch line includes a launcher defining a passageway through which a resin impregnated pipe liner and bladder tube assembly passes. An inflatable member mounted to the launcher assembly is actuatable between an inflatable condition and a deflated condition. The pipe liner and bladder tube are secured in place by expanding the inflatable member outward against the inner surface of the branch line. Air pressure drives the bladder tube and pipe liner into the branch line. The bladder tube remains in place until the pipe liner hardens.

14 Claims, 6 Drawing Sheets

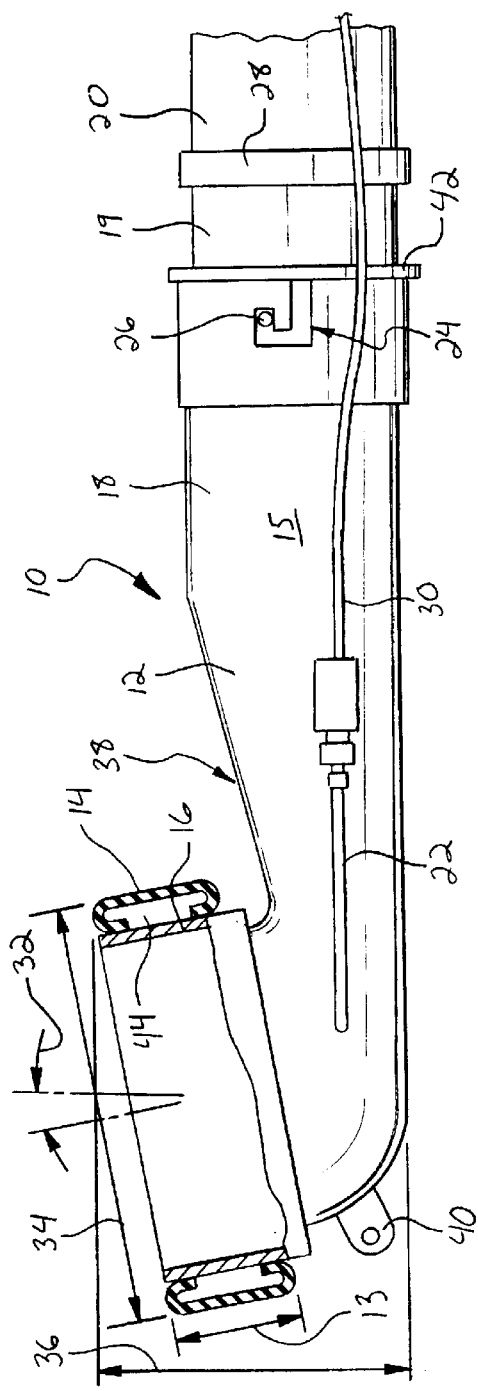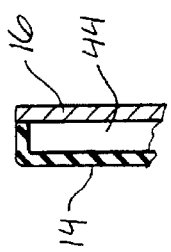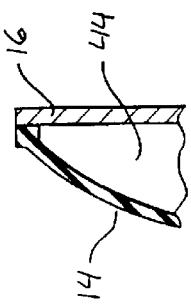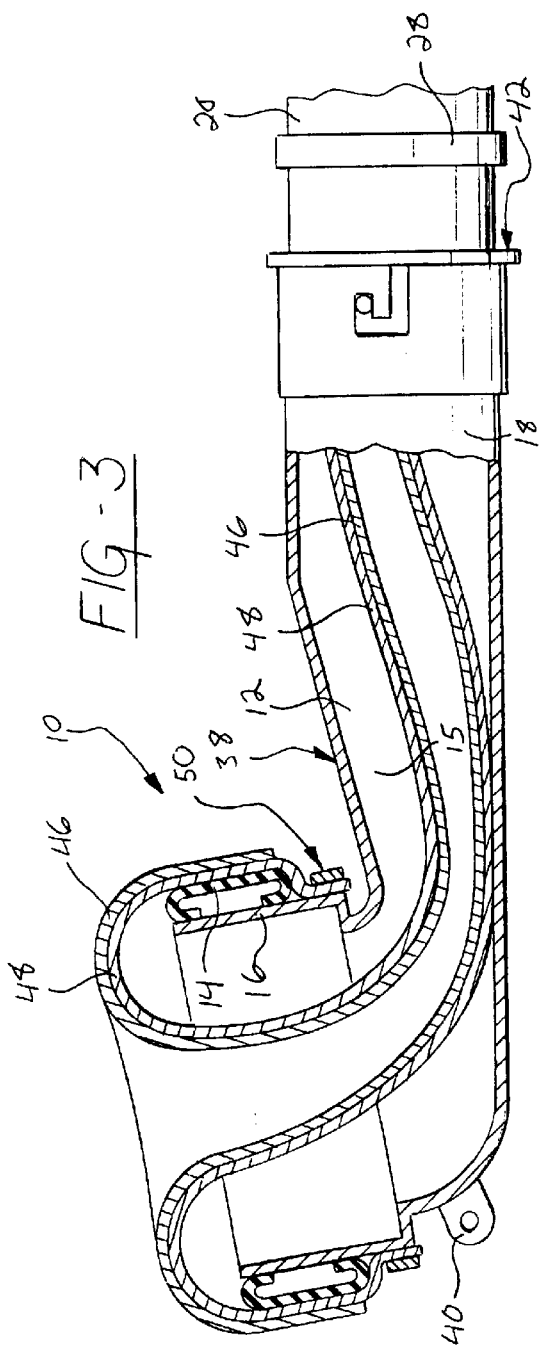

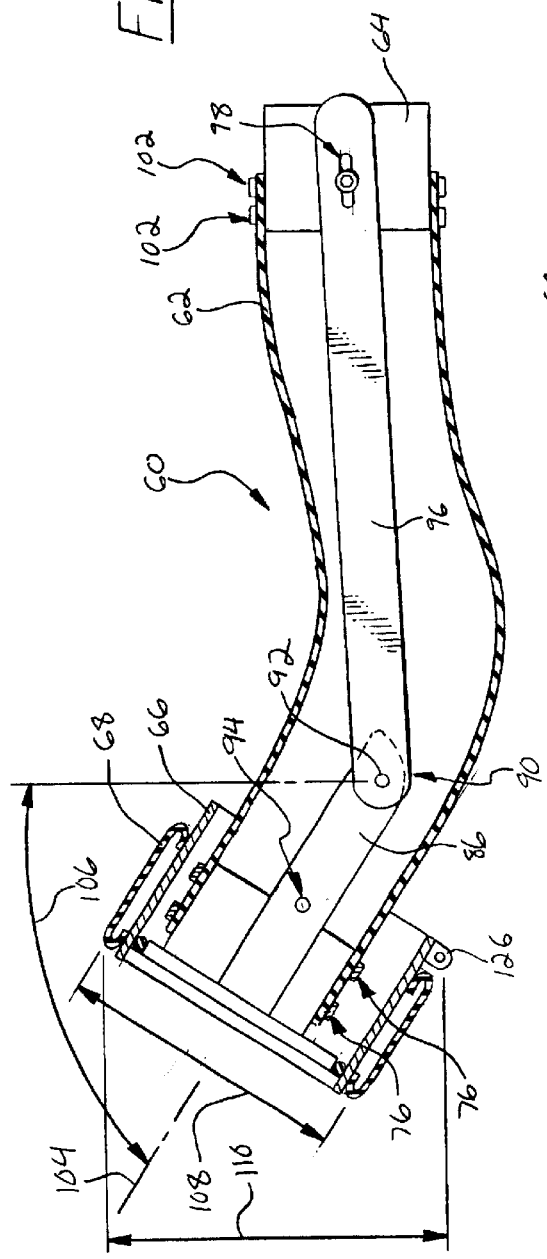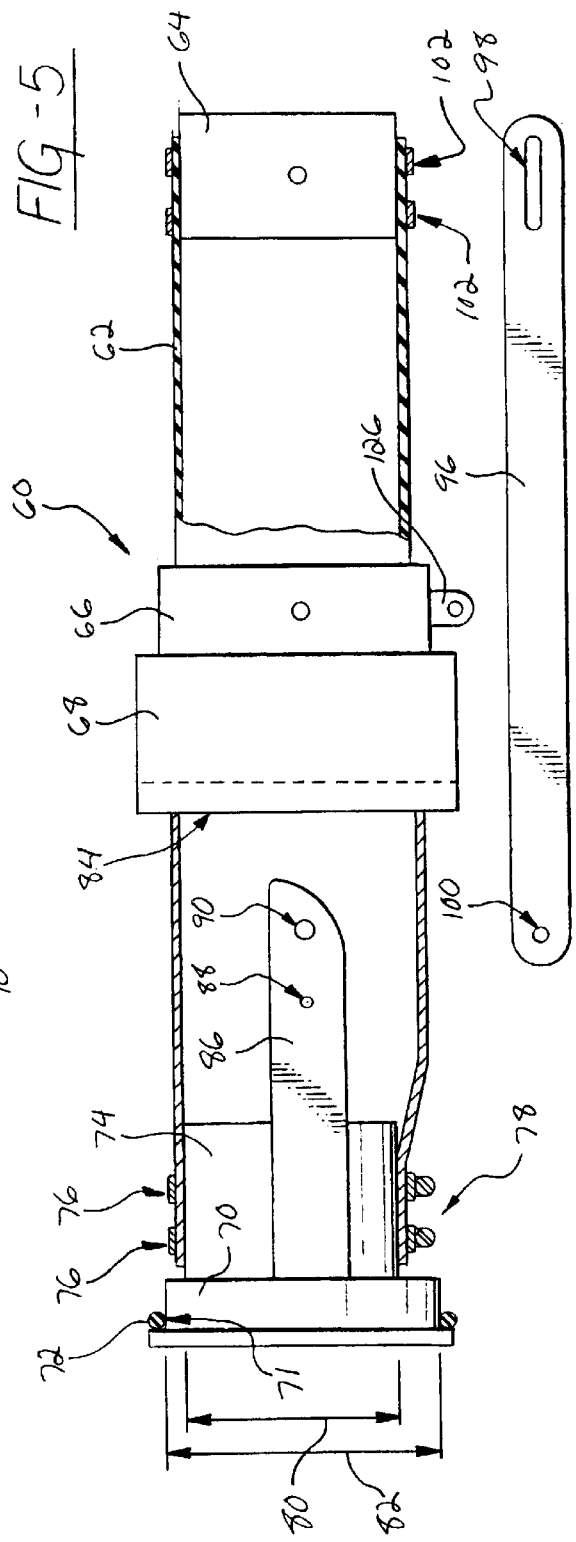

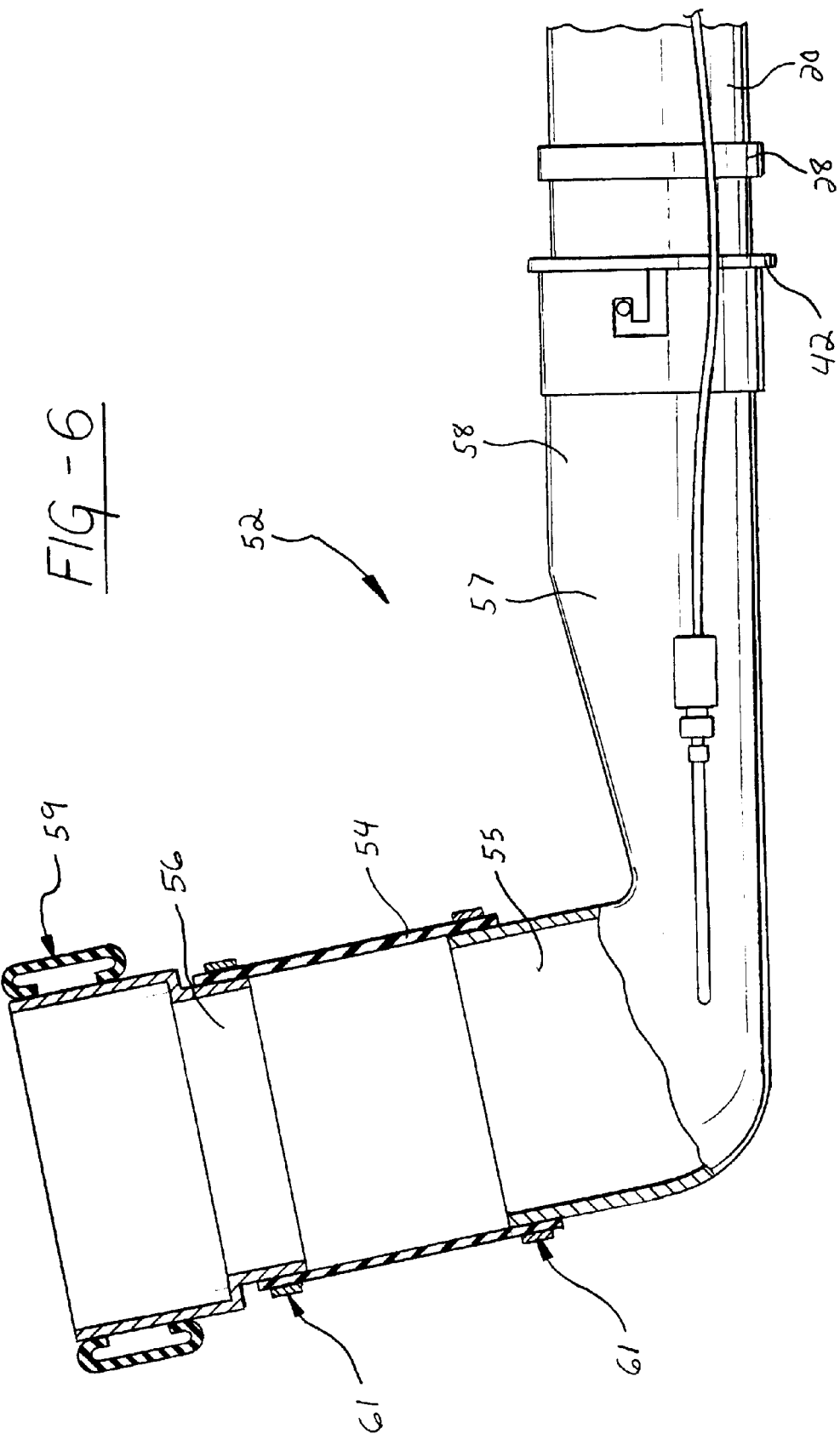

METHOD AND DEVICE FOR LINING A LATERAL SEWER PIPE

This application is a continuation of U.S. application Ser. No. 10/102,059 filed on Mar. 19, 2002, now U.S Pat. No. 6,484,757.

BACKGROUND OF THE INVENTION

This invention relates to an assembly and method for installing a pipe liner within a sewer pipe, and specifically to an assembly and method for installing a pipe liner within a branch line of a sewer pipe.

Typically, a sewer pipe includes a main line which extends substantially parallel to a street or road. Residents or buildings include branch lines that extend from the building to the main line. Conventional repair of sewer pipes includes digging the pipes up and replacing the damaged areas. Often times it is undesirable to dig a hole to obtain access to the sewer pipes. Further, digging a hole to gain access to sewer pipes is expensive, unsightly, and very undesirable along with being time consuming.

It is known in the art to reline sewer pipes in place through access holes such as manholes. The relining in place process includes a resin impregnable liner installed within the tube and held in place until hardened. The resin impregnable liner becomes a new pipe installed within the old pipe. This method of repair is essentially transparent to residents, meaning that the surrounding area is not disturbed or dug up. The relining process includes the use of an inflatable bladder along with the resin impregnable pipe liner which inserts within the sewer pipe. The bladder tube inflates to drive the resin impregnable pipe liner outward against the inner surface of the sewer pipe. The bladder tube remains inflated in place until the resin impregnable pipe liner hardens.

Typically, the lining of a branch pipe is best performed from a point within the main sewer pipe. A known device for installing a lateral line from a main line includes a carrier assembly designed for use with a t-shaped bladder assembly. The t-shaped bladder assembly includes a first portion that inflates within the main sewer and a second portion that extends from the first portion into the branch pipe. The pipe liner assembly is also t-shaped, and includes a main line section and a branch section. The main line section forms a sectional liner within the main sewer pipe and the branch section extends from the main section into the branch pipe. This device requires that the main line section of the bladder assembly be inflated before the branch section of the liner will extend into the branch pipe.

In some instances, the main line bladder portion includes a relatively large unsupported area. The unsupported area is not in contact with the inner surface of the main line or the outer surface of the carrier. The unsupported surface is especially susceptible to rupture under certain circumstances. As appreciated, if the bladder assembly bursts during installation, and before the pipe, liner has been fully extended within the branch line pipe, the resin impregnable liner will harden in a crumpled condition within the branch pipe. Such a condition requires remedial action by the contractor installing the pipe liner. Remedial action includes digging up the pipe and removing the uninverted pipe liner and installation equipment.

Accordingly, it is desirable to develop an assembly and method for installing within a resin impregnable pipe liner within a branch line that is reliable and supports substantially all of the bladder assembly.

SUMMARY OF THE INVENTION

An embodiment of this invention is a launcher assembly including an inflatable member actuatable between inflated and deflated conditions to secure the launcher, pipe liner and bladder assembly within a branch line pipe.

The launcher includes a retainer and guide connected by a body portion to define a passage through which the bladder and pipe liner pass from a main line sewer pipe to a branch line sewer pipe. The inflatable member is attached to the retainer and has an outer diameter sized to cooperate with an inner surface of a branch line pipe. The guide connects to a carrier tube through which the pipe liner and bladder are passed. The launcher includes an air hose in communication with a cavity of the inflatable member that provides for the actuation of the inflatable member between inflated and deflated conditions.

The body of the launcher is configured to fit within the main pipe. The retainer extends transversely from the body at a predetermined angle for pivoting of the launcher within the main pipe up into the branch line pipe. The launcher includes a height measured from a bottom portion of the body to the top most portion of the retainer. This height is configurable to allow the launcher to fit within a specific main line pipe.

The guide of the launcher includes a quick connection feature that cooperates with the carrier tube allowing a single carrier tube to be used with many different configurations of the launcher. The height of the launcher and the diameter of the retainer are configured to allow installation of a pipe liner within many known branch and main line sewer pipe configurations.

In operation, the bladder tube is inserted through the passageway defined by the launcher and cuffed over the outer diameter of the inflatable member. The cuffed end of the bladder tube is secured to the retainer by a band clamp. The pipe liner is then extended from within the bladder tube and cuffed over the bladder tube disposed on the outer diameter of the inflatable member. The launcher is then lifted into the branch pipe, where the inflatable member is actuated to the inflated position to secure an end of the bladder and pipe liner against an inner surface of the branch pipe. Note that the bladder tube is secured in place mainly by the clamp with the additional securing force exerted by the inflatable member. The inflatable member inflates to trap the bladder and pipe liner against the inner surface of the branch pipe. Air pressure applied to the bladder tube drives the bladder tube and pipe liner into the branch pipe.

Branch pipes are often not configured perpendicular to the main line pipe. Another embodiment of this invention includes a pivotal connection between the retainer and guide portion to allow for adjustment of the angle of the launcher for use in branch line pipes that connect to the main line sewer pipes at angles other than 90°. In this embodiment, the retainer portion and guide portion define a passageway through which the pipe liner and bladder assembly pass during the installation process. Between the retainer and guide is a body tube. The body tube is a flexible tube providing an airtight connection between the retainer and guide that protects the pipe liner and bladder assembly as they pass through the launcher.

The launcher of this embodiment includes an insert that seats within the retainer and includes an insert arm. The insert arm extends from the retainer and attaches to a pivot arm. The point of attachment between the insert arm and the pivot arm is adjustable to adapt to branch line pipes of different angles. Further, the pivot arm attaches to the guide by way of a fastener disposed within a slot. The slot of the pivot arm provides for movement of the retainer relative to the guide during installation of the launcher into a branch line pipe. The pivotal connection between the insert arm and the pivot arm along with the pivotal connection between the pivot arm and the guide allows for some movement of the launcher during installation into the branch line pipe.

This invention also includes a method of installing a pipe liner within a branch liner pipe. The method includes the steps of first clamping a bladder tube assembly to an outer diameter of a retainer portion of the launcher assembly. Installing a pipe liner to the outer diameter of the retainer portion to the outside of the previously installed bladder tube assembly. The method further includes the step of inserting the launcher into the branch line to a point where the inflatable member is substantially within the branch line. The inflatable member is inflated to trap the bladder tube and pipe liner assembly between the retainer and the inner surface of the branch line sewer pipe. Note that although the inflatable member traps the bladder tube, the bladder tube secured to the retainer by way of clamps to create a reliable airtight seal. Air pressure drives the bladder assembly forward of the launcher assembly into the branched line pipe. The bladder assembly remains in place to hold the pipe liner against the inner surface of the branch line pipe until the pipe liner has fully hardened. Once the bladder assembly is inflated, the inflatable member is deflated. The launcher remains in place until the pipe liner hardens. The bladder assembly is then deflated and pulled from the branch line. The pipe liner remains in the branch line pipe to form a new inner surface.

The launcher assembly of this invention provides a simple and reliable method of installing a resin impregnable pipe liner within a branch line pipe that prevents rupture by supporting substantially all of the bladder tube.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a schematic view of a launcher assembly for installing a pipe liner;

FIG. 2A is a partial cross-sectional view of the inflatable member in a deflated condition;

FIG. 2B is a partial cross-sectional view of the inflatable member in an inflated condition;

FIG. 3 a cross-sectional view of the launcher assembly with a pipe liner and a bladder assembly;

FIG. 4 is a side view of an alternate embodiment of the launcher assembly;

FIG. 5 is an exploded view of an additional embodiment of the launcher assembly;

FIG. 6 is a cross-sectional view of an alternate embodiment of the launcher assembly;

DETAILED DESCRIPTION OF THE PREFERRED EMBODIMENT

Figure 7:
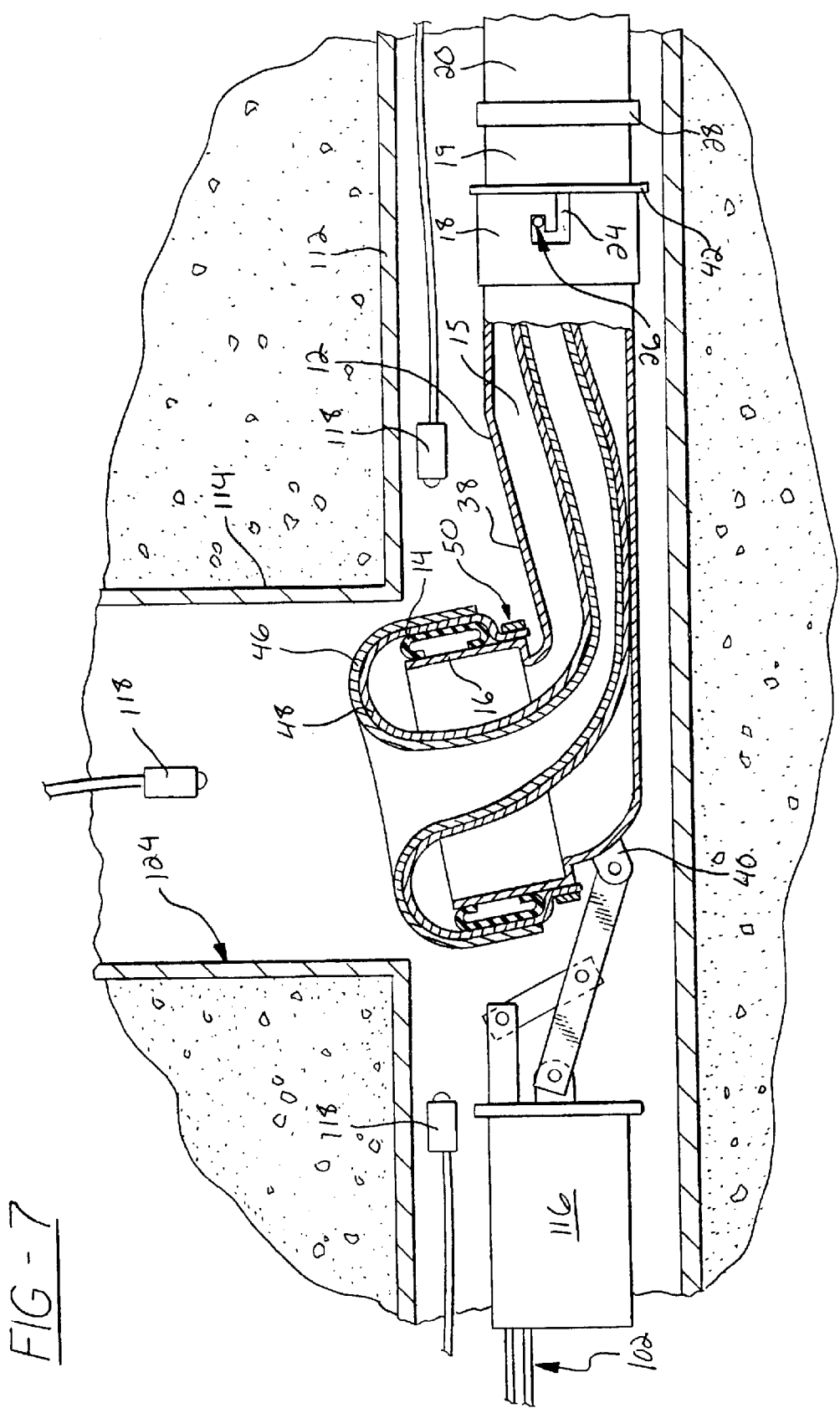
FIG. 7 is a cross-sectional view of the launcher assembly during installation into a branch line sewer pipe.

Referring to FIGS. 1 and 3, an embodiment of this invention is a launcher assembly 10 for installing a pipe liner 46 within a branch line pipe and includes a body 12 extending between a retainer 16 and a guide 18. The body 12 guide 18 and retainer 16 define a passage 15 through which the pipe liner 46 and a bladder assembly 48 passes during installation into a branch line sewer pipe. An inflatable member 14 mounts to an outer diameter of the retainer 16. The inflatable member 14 includes a width 13 defined by the retainer 16. The width 13 is limited by the configuration of the retainer 16. Referring to FIGS. 2A and B, the inflatable member 14 is attached to the retainer 16 to define a cavity 44. The inflatable member 14 is actuatable between an inflated condition (FIG. 2B) and a deflated condition (FIG. 2A). The cavity 44 is an air tight space into which air is introduced by way of an air inlet 22.

Referring to FIG. 1, the guide 18 includes a mounting slot 24 that cooperates with a pin 26 disposed on a carrier tube 20. The carrier tube 20 is a flexible tube extending within the main line to provide a protected passage for the pipe liner and bladder assembly. The carrier tube 20 includes a collar 19. The collar 19 is a rigid tube that includes the pin 26. The carrier tube 20 attaches to the collar 19 by way of a clamp 28. Clamp 28 is typically a hose clamp or any other such clamp that is known to a worker skilled in the art. An o-ring 42 is disposed between the guide 18 of the launcher 12 and the collar 19 of the carrier tube 20.

The embodiment of the launcher assembly 10 shown in FIG. 1 is specifically adapted for installing a pipe liner 46 into a branch line that is substantially transverse with the main line. The retainer 16 extends from the body 12 of the launcher 10 at an angle less than 90°. Preferably, the angle 32 is between 10 and 15 degrees from perpendicular. The angle 32 allows rotation of the launcher assembly 10 within the main line up into the branch line sewer pipe. To further facilitate pivoting of the launcher assembly 10 up into a branch line pipe, the body portion 12 includes a ramped surface 38. The ramped surface 38 reduces the overall width of the body 12 in a portion near the retainer 16. This reduction in overall width provides for the insertion of the launcher assembly 10 into the branched line pipe and will be further illustrated in FIG. 8 described below.

The launcher assembly 10 includes a height 36 compatible with the space defined by a main line sewer pipe. Further, the retainer 16 along with the inflatable member 14 defines an outer diameter 34. The outer diameter 34 fits within a branch line sewer pipe along with the bladder assembly 48 and the pipe liner 46.

Preferably, the inflatable member 14 is an inflatable collar disposed around the entire circumference of the retainer 16. The width 13 of the inflatable member 14 is only a portion of the width 13 of the retainer 16, to allow space for the clamp 50. The inflatable member 14 is bonded to the retainer 16 to form an airtight seal in the cavity 44. Although preferably the inflatable member 14 is a collar disposed about the perimeter of the retainer 16, it is within the contemplation of this invention that the inflatable member 14 be disposed in discrete locations about the perimeter of the retainer 16. Further, it is within the contemplation of this invention that other configurations of the inflatable member 14 may be of any configuration calculated to hold both the launcher 12 along with the bladder tube 48 and pipe liner 46 within a branch line sewer pipe.

Referring to FIG. 3, the launcher assembly 12 is shown with the pipe liner 46 and bladder tube 48 ready for installation. The pipe liner 46 and bladder tube 48 are cuffed over the retainer 16 and inflatable member 14 such that upon inflation of the inflatable member 14 both the bladder tube 48 and pipe liner 46 are trapped between the retainer 16 and an inner surface of the branch line sewer pipe. The remaining length of the pipe liner 46 and bladder tube 48 are disposed within the passage 15 defined by the body 12 of the launcher assembly 10.

Referring to FIG. 4, another embodiment of the launcher assembly 60 includes a flexible body tube 62 attached to a guide 64 at one end and an insert 70 disposed within a retainer 66. The body tube 62 is preferably a flexible tube that allows for relative pivoting movement between the guide 64 and retainer 66. The insert 70 disposed within the retainer 66 includes a mount 74. The body tube 62 is clamped to the mount 74 by way of pipe clamps 76. The body tube 62 is also attached to the guide 64 by pipe clamps 102.

The mount 74 defines an outer diameter 80 and the insert diameter 82 includes a shoulder 71 that defines a diameter 82. The diameter 80 of the mount 74 and the diameter 82 of the insert 70 are off-center to create an offset indicated at 78. The offset 78 provides a space for the clamps 76. As appreciated, upon installation of the insert 70 into the retainer 66 the clamps 76 require additional space above that provided by the shoulder 71. The shoulder 71 provides a sealing surface on which an o-ring 72 is disposed to create an airtight seal. The shoulder 71 cooperates with shoulder 84 of the retainer 66 to seal against the o-ring 72 to form the airtight seal.

Referring to FIGS. 4, 5 an inflatable member 68 is adhered to the outer diameter of the retainer 66. As disclosed in the previous embodiment, the inflatable member 68 is actuatable between an inflated and deflated condition. An insert arm 86 extends from the insert 70 through the retainer 66 to engage pivot arm 96. The pivot arm 96 is attached to the insert arm 86 at the pivotal connection 90 by way of a fastener 92. The fastener 92 allows for relative movement between the insert arm 86 and the pivot arm 96. The insert arm 86 also includes a fastening connection 94. The pivot arm 96 is attached to the guide 64 by a fastener disposed within a slot 98. Movement of the pivot arm 96 within the slot 98 allows for pivoting of the retainer 66 relative to the guide 64. The angle 106 of the retainer about the pivotal connection 90 allows for the launcher assembly 60 to be specifically configured for the angle of the branch line extending from the main line. Further, the height 110 of the launcher 60 is also dependent on the angle 106. This provides for the use of this launcher assembly in numerous applications of main line sewer pipe and branch line sewer pipe.

Figure 9:
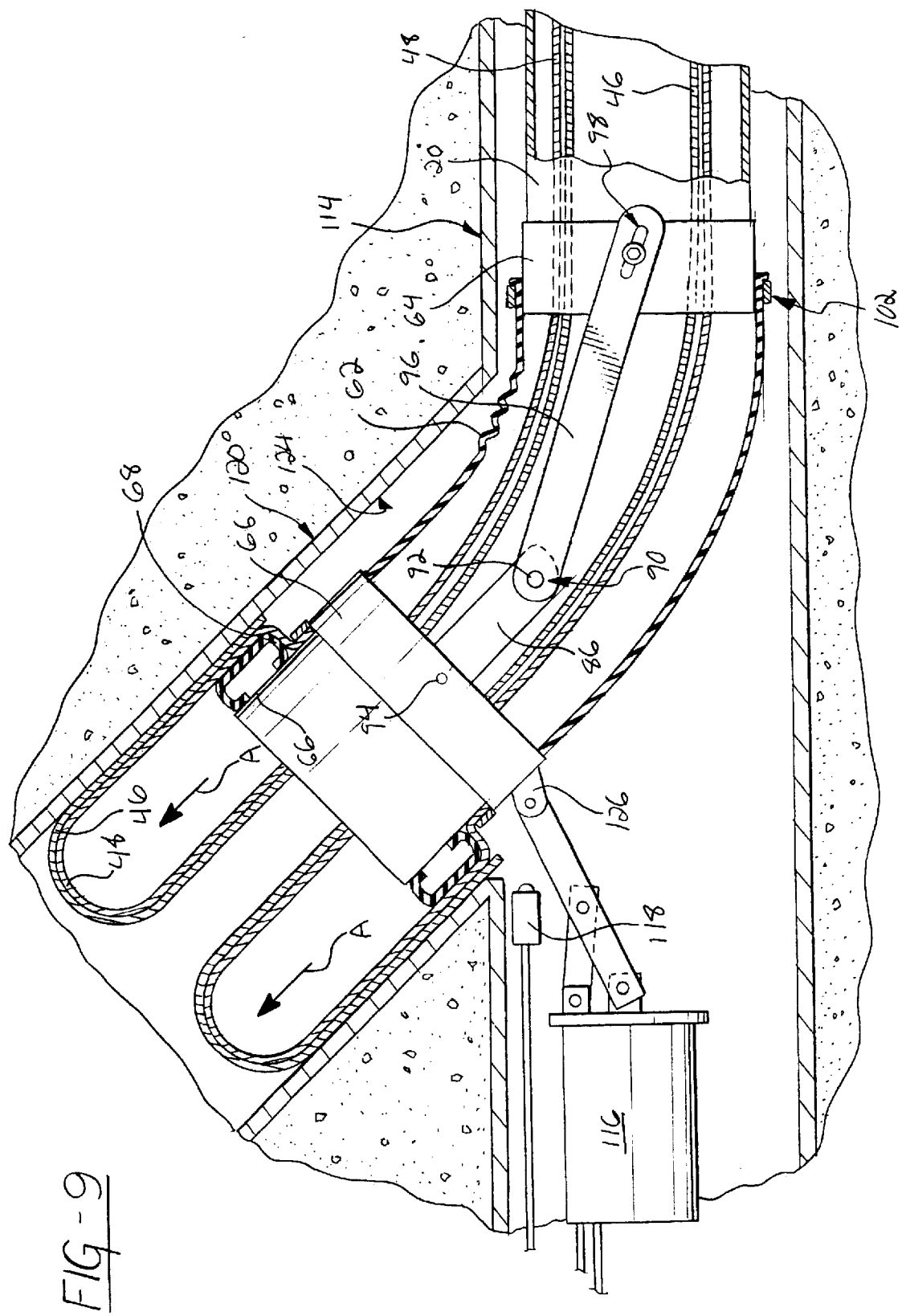
FIG. 9 is a cross-sectional view of another embodiment of the launcher assembly installed into a y-branch line sewer pipe.

The outer diameter 108 of the retainer assembly 66 includes the inflatable member 68 sized to fit within the branch line. The flexible body 62 allows for the pivotal movement between the retainer 66 and the guide 64. The guide 64 is attached to the carrier tube 20 through which the pipe liner and bladder tube assembly pass during installation of the branch line pipe (FIG. 9).

Referring to FIG. 6, another embodiment of the launcher assembly 52 is shown including a flexible retainer tube 54. Clamps 61 secure the retainer tube 54 between retainer 56 and neck 55 of the launcher body 57. The flexible retainer tube 54 allows movement of the retainer 56 relative to the body 57. Movement between the retainer 56 and body 57 provide for installation of the launcher assembly 52 within a branch line of differing angles from the main. As appreciated, branch lines may extend at angles from the main line that required movement of the retainer 56 relative to the body 57.

This embodiment of the launcher assembly 52 also extends the retainer 56 above the body 57 to provide for application were the inner diameter of the main line requires that the launcher 52 be lifted an excessive distance into the branch line. The body tube 54 eliminates the need to excessively lift or tilt the launcher assembly 52 during installation. The length of the body tube 54 is application specific, and it is within the contemplation of this invention that body tubes of varying lengths are used for specific applications.

The retainer tube 54 is flexible, however, the retainer tube 54 also supports the retainer 56 in the upright extended position. The retainer tube 54 allows limited movement relative to the body 57 such the retainer 56 and inflatable member 59 do not require additional support during installation into the branch line. The retainer tube 54 holds the retainer 56 at a specific angle relative to the body 57, and allows limited relative movement to accommodate branch line and main line variations.

Referring to FIG. 7, an embodiment of this invention is a method for installing a pipe liner 46 within a branch line sewer pipe 114. The method includes the installation of the pipe liner 46 and 48 to the retainer 14. Note that FIG. 6 is an embodiment of this method for installing a pipe liner 46 within a branch line pipe 114 substantially perpendicular to the main line sewer pipe 112. Preparation for installation of the pipe liner 46 into the branched line pipe 114 includes installing the bladder tube 48 into the launcher assembly 10. Installation of the bladder tube 48 includes the cuffing or overlapping of the bladder 48 around the retainer 14 and inflatable member 14. The bladder tube 48 is then clamped to the outer diameter of the retainer 16 by way of hose clamp 50. The hose clamp creates an airtight seal between the bladder assembly and the launcher assembly 10. In the next step, the pipe liner 46 is cuffed over the inflatable member 14 and to the outside of the bladder 48. The pipe liner 46 is impregnated with a curable resin before being installed onto the launcher assembly 12. Impregnating of the pipe liner 46 with a curable resin is a well known aspect in pipe liner installation, and a worker skilled in the art would recognize that many different methods of impregnating the pipe liner are within the contemplation of this invention.

The launcher assembly 10 is attached to a positioning/rotating/lifting machine 116. The machine 116 attaches to the lug 40 of the launcher assembly 10. The machine 116 is inserted into the main line 112 through a manhole or access opening (not shown) opposite the launcher assembly 112. Guide and control lines 122 extend from the machine 116 to the surface.

Cameras 118 are disposed within the main line 112 and branch line 114 of the sewer pipe. The cameras 118 transmit a view of the position of the launcher assembly 10 to an operator on the surface to guide the machine 116 and the launcher 112 into place. Preferably, a camera 118 is mounted directly to the machine 116. Note that the position of the camera 118 is application specific and that more or less cameras 118 may be used to view installation of the launcher assembly 10 within the branch line pipe. The cameras 118 may be of any type known to a worker skilled in the art and may be positioned in various locations around the launcher 12 and machine 116. The position of the various cameras 118 are determined by the specific application and configuration of the sewer pipe in the repair area.

Figure 8:
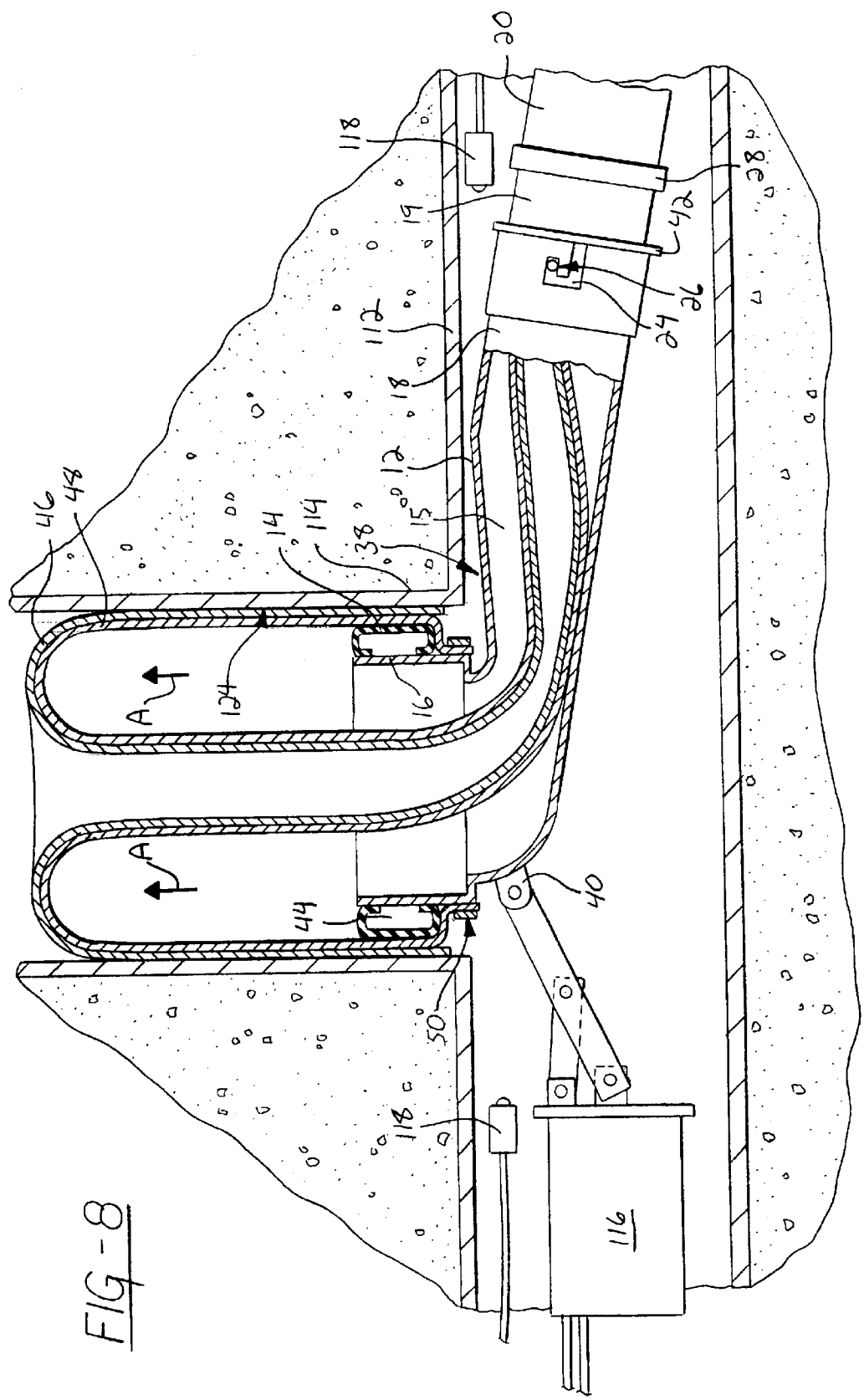
FIG. 8 is a cross-sectional view of the launcher assembly installed within the branch line of the sewer pipe.

Referring to FIG. 8, the launcher 10 is lifted into the branch pipe 114 by the machine 116. The inflatable collar 14 is then actuated to the inflated condition to trap the bladder 48 and pipe liner 46 against the inner surface 124 of the branch pipe 114. Once the inflatable collar 14 has trapped the bladder 48 and pipe liner 46 against the inner surface 124 of the branch line 114, air pressure applied, as indicated by arrows A, drives the bladder assembly 48 and pipe liner 46 into the branch pipe 114. As the air pressure indicated at A, drives the bladder 48 and pipe liner 46 into the lateral tube 114, the entire length of the pipe liner 46 is drawn through the passage 15 of the launcher assembly 10. Air pressure applied to the bladder assembly 48 is introduced through the carrier tube 20. Extension of the bladder assembly 48 and pipe liner 46 occurs substantially instantaneously at a pressure creating enough force to drive the pipe liner 46 into the branched line sewer pipe 114.

Referring to FIG. 9, an additional embodiment of this method is shown. In this embodiment, the launcher assembly 60 is installed to a y-branch line 120 from the main line sewer 114. The method of installation further includes pivoting the retainer 66 relative to the guide 64 during insertion into the branch line 120. The machine 116 lifts the retainer 64 into the branch pipe 120, pivoting the retainer 66 relative to the guide 64. Note that in FIG. 9 only one camera 118 is shown that is secured to the machine 116.

Inflating the inflatable member 68 to secure the retainer 66, pipe liner 46 and bladder assembly 48 against an inner surface 124 of the branch line 120. Air pressure applied in the direction indicated by arrows A drives the bladder assembly 48 and pipe liner 46 into the branch line 120. The inflatable member 48 is then deflated. Note that the bladder 48 supports the launcher assembly 60 once full inflated. The bladder 48 remains inflated until the pipe liner 46 hardens. Once the pipe liner 46 is hardened, the bladder 48 is deflated and removed.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An assembly for introducing a pipe liner into a sewer pipe, said assembly comprising;
    a launcher defining a passageway through which said pipe liner passes;
    an inflatable member defining a cavity isolated from said passageway attached to said launcher and actuatable between an inflated and deflated condition for securing said launcher within the sewer pipe during installation of said pipe liner.

2. The assembly of claim 1, wherein said inflatable member is bonded to said launcher.

3. The assembly of claim 1, wherein said inflatable member defines an inner cavity including an air inlet, said air inlet in communication with a source of pressurized air for selectively expanding said inflatable member.

4. The assembly of claim 1, wherein said launcher comprises a retainer and a guide, said inflatable member mounted to said retainer.

5. The assembly of claim 4, wherein said retainer extends transversely from said guide.

6. The assembly of claim 4, further including a flexible retainer tube attached between said guide and said retainer to allow relative movement between said guide and said retainer.

7. The assembly of claim 4, further including a pivotal connection between said retainer and said guide.

8. A method of installing a pipe liner within a sewer pipe comprising the steps of;
    positioning one end of the pipe liner over an inflatable member attached to a retainer and actuatable between inflated and deflated conditions;
    placing the retainer member within a sewer pipe;
    inflating the inflatable member to said inflated condition securing said pipe liner within the sewer pipe during installation;
    everting the pipe liner forward of the retainer into the sewer pipe.

9. The method of claim 8, further comprising the step of securing an inflatable bladder to the retainer between the retainer and the pipe liner.

10. The method of claim 9, further comprising the step of inflating the inflatable bladder to drive the pipe liner into the sewer pipe.

11. The method of claim 8, further comprising the step of forcing the pipe liner against the inner surface of the sewer pipe for a curing period.

12. The method of claim 8, further comprising attaching the retainer to a positioning device and aligning the retainer member within said sewer pipe.

13. An assembly for introducing a pipe liner into a sewer pipe, said assembly comprising;
    a launcher comprising a guide and a retainer extending transversely from said guide, said launcher defining a passageway through which said pipe liner passes; and
    an inflatable member attached to said retainer and actuatable between an inflated and deflated condition for securing said launcher within the sower pipe during installation of said pipe liner.

14. The assembly of claim 13, further including a flexible retainer tube attached between said guide and said retainer to allow relative movement between said guide and said retainer.

* * * * *

UNITED STATES PATENT AND TRADEMARK OFFICE
CERTIFICATE OF CORRECTION

PATENT NO.     : 6,695,013 B2
DATED          : February 24, 2004
INVENTOR(S)    : Warren It is certified that error appears in the above-identified patent and that said Letters Patent is hereby corrected as shown below:

Column 8,
Line 26, please insert -- and -- after ";".
Line 51, "sower" should read as -- sewer --.

Signed and Sealed this

Twenty-second Day of June, 2004

JON W. DUDAS
*Acting Director of the United States Patent and Trademark Office*